(12) United States Patent
Henry et al.

(10) Patent No.: US 10,086,688 B2
(45) Date of Patent: Oct. 2, 2018

(54) IN-TANK SUCTION FILTER AS THE RESERVE CAVITY FOR A FLUID DELIVERY MODULE ASSEMBLY

(71) Applicant: KUSS FILTRATION, INC., Findlay, OH (US)

(72) Inventors: Christophe Henry, Langolen (FR); Julie Anne Graber, Findlay, OH (US)

(73) Assignee: GVS Filtration Inc., Findlay, OH (US)

( * ) Notice: Subject to any disclaimer, the term of this patent is extended or adjusted under 35 U.S.C. 154(b) by 829 days.

(21) Appl. No.: 14/192,493

(22) Filed: Feb. 27, 2014

(65) Prior Publication Data

US 2014/0238510 A1      Aug. 28, 2014

Related U.S. Application Data

(60) Provisional application No. 61/770,754, filed on Feb. 28, 2013.

(51) Int. Cl.
*C02F 1/00* (2006.01)
*B60K 15/03* (2006.01)

(52) U.S. Cl.
CPC ...... *B60K 15/03* (2013.01); *B60K 2015/0321* (2013.01); *B60K 2015/03111* (2013.01); *B60K 2015/03236* (2013.01); *B60K 2015/03453* (2013.01); *B60K 2015/03473* (2013.01); *Y10T 137/794* (2015.04)

(58) Field of Classification Search
None
See application file for complete search history.

(56) References Cited

U.S. PATENT DOCUMENTS

| 2,937,755 A | * | 5/1960 | Szwargulski | B01D 17/10 210/172.3 |
| 4,561,977 A | | 12/1985 | Sasaki | |
| 5,409,608 A | * | 4/1995 | Yoshida | B01D 29/15 210/315 |
| 5,607,578 A | * | 3/1997 | Ohkouchi | B01D 35/027 210/172.4 |
| 5,716,522 A | * | 2/1998 | Chilton | B01D 29/111 210/317 |
| 6,638,423 B2 | | 10/2003 | Dockery | |
| 6,878,275 B2 | | 4/2005 | Yamada | |
| 7,182,869 B2 | | 2/2007 | Catlin et al. | |

(Continued)

OTHER PUBLICATIONS

International Search Report/Written Opinion in PCT/US2014/019069 dated Jun. 17, 2014.

*Primary Examiner* — Amber Rose Orlando
*Assistant Examiner* — Phillip Y Shao
(74) *Attorney, Agent, or Firm* — Brinks Gilson & Lione

(57) ABSTRACT

A fuel delivery module is located inside a fuel tank and supplies fuel from the fuel tank to the engine. An in-tank suction fluid filter has a filter body made of combination material layers with porous material and filtration material. An in-tank suction fuel filter functions to filter the fuel and holds a reservoir of fuel for supplying to the fuel pump. The in-tank suction fuel filter acts as the reservoir cavity needed to have a constant supply of filtered fuel available to the fuel pump. The in-tank suction fuel filter has a freeform body that can move upward or downward with thermal expansion of the fuel while maintaining constant contact with the bottom of the fuel tank.

15 Claims, 6 Drawing Sheets

(56) References Cited

U.S. PATENT DOCUMENTS

| | | | |
|---|---|---|---|
| 8,173,013 B2 * | 5/2012 | Sato | B01D 35/0273 210/172.4 |
| 2009/0256317 A1 * | 10/2009 | Mellander | B60K 15/03 277/642 |
| 2012/0168006 A1 * | 7/2012 | Suhwan | F02M 37/025 137/544 |

* cited by examiner

IN-TANK SUCTION FILTER AS THE RESERVE CAVITY FOR A FLUID DELIVERY MODULE ASSEMBLY

CROSS-REFERENCE TO RELATED APPLICATIONS

This application claims the benefit of U.S. Provisional Patent Application Ser. No. 61/770,754 filed on Feb. 28, 2013, entitled "IN-TANK SUCTION FILTER AS THE RESERVE CAVITY FOR A FLUID DELIVERY MODULE ASSEMBLY," the entire contents of which are incorporated herein by reference.

TECHNICAL FIELD OF THE INVENTION

The present invention relates to liquid delivery systems and the in-tank suction fluid filters on in-tank pump assemblies for these liquid delivery supply systems, and more particularly to an integrated system that combines the pump, in-tank suction fluid filter and sender assembly into a single module that is positioned in the fluid tank. These liquid delivery systems are common in transportation fuel delivery systems and in diesel emissions fluid delivery systems.

BACKGROUND OF THE INVENTION

Existing liquid delivery module tank systems, such as for automotive fuel or diesel emissions fluid, is an integrated system that combines a combination of a pump, fluid reservoir, in-tank suction filter, an optional bracket assembly, leveling springs, a pressure regulator, a liquid level sender assembly and a pressure filter, into a single unit that is positioned at the bottom inside of the tank. One example is the fuel delivery module system used for automotive fuel located inside the fuel tank. The fuel pump is situated inside a hard body reservoir structure and flows fuel from the inside of the hard body reservoir and supplies the fuel through it from the fuel tank to the engine. An in-tank fluid filter is positioned inside the hard body reservoir and has a filter body made of porous material with an attached plastic outlet port for connecting the filter to an inlet fitting on the fuel pump. The outlet port of the filter has a flow axis defined by an intended direction of fluid flow from the filter to the pump. The in-tank suction fluid filter is used to filter the fuel present in the fuel tank prior to entering the fuel pump. This filter is described with the term suction because the pump acts as a suction to pull fuel through the filter. In some embodiments there is a second filter positioned at the outlet of the fuel pump which filters fuel coming out of the fuel pump and before the fuel enters the engine. This filter is often referred to as a pressure side filter because the pump develops pressure against this filter to push fuel through the pressure side filter.

The hard body reservoir is a plastic molded or metal canister that contains the in-tank suction fuel filter and fuel pump and acts as a holder of fuel to maintain a constant supply of fuel to the fuel pump. The design of the reservoir improves drivability during dynamic handling conditions by maintaining a supply of fuel for the fuel pump. An example of such a reservoir is disclosed for a fuel delivery module in U.S. Pat. No. 5,665,229, the disclosure of which is incorporated herein by reference. The reservoir adds to manufacturing costs by requiring additional human labor and material.

The fuel delivery module needs to rest on the bottom of the fuel tank to be in contact with the fuel at the bottom of the tank to accommodate for low fuel conditions when the amount of fuel in the tank is at its lowest. The fuel tank height will increase or decrease with thermal expansion as temperature and pressure changes inside the tank. The fuel delivery module must be able to accommodate this tank height change to maintain contact with the bottom the tank. Current designs utilize height adjusting springs in the fuel delivery module to allow the module to expand and contract with the tank height change. The springs are placed under a constant compressive load when the fuel delivery module is installed into the fuel tank and the springs can extend up and down to expand or contract the height of the module as the fuel tank height changes.

SUMMARY OF THE INVENTION

The present invention eliminates the additional costs of a reservoir and height adjusting springs by providing an in-tank fluid filter that can act as the fluid reservoir and flexes to expand and contract with the tank height change.

In one aspect of the invention, the Fuel Delivery Module apparatus is comprised of a fuel pump, in-tank suction fuel filter, a fuel level sender assembly, pressure regulator, bracket assembly and an optional in-tank pressure fuel filter. The in-tank suction fuel filter is comprised of two or more layers of porous filtration media. These layers are separated by a cavity of fuel. The in-tank suction filter includes molded plastic components that attach the filter to the body of the fuel pump and the tank floor and includes valve(s) to allow fluid to enter the filter and valve(s) to allow air to exit the filter.

One preferred embodiment has the in-tank suction fuel filter comprised of three layers of porous filtration media. This design creates two separate reserve cavities of fluid. The lowest layer of media acts as a tight membrane that holds a reserve of fuel. The pore opening of this lowest layer of filtration media is suggested to be less than 20 micron to enable the capillary sealing action to maintain fluid internally to the filter. This media may be of the filtration media group that includes membranes, woven screen or non woven materials such as meltblown, wet laid and spunbond media. The two uppermost layers of media acts as the filtering layers to remove dust and debris from the fuel as it enters the uppermost reserve cavity and before entering the fuel pump. These two uppermost layers act to create a second reservoir of filtered fluid for supply to the fuel pump. The pore opening of the upper and center layers is suggested to match the particle size filtering protection needed for the fuel pump, for example 40 micron. These fuel pump protection requirements range from 8 micron to 100 micron. This is the range of particle that can damage the internal components of the fuel pump. Different combinations of design and materials will make fuel pumps more susceptible to wear at a defined particle size area. Some fuel pumps are more durable to smaller particles and require less filtering out of the particles, and thus different pumps may require different filtration capacities than those listed herein.

The lower layer of porous filtration media includes a one direction valve that allows unfiltered fuel to flow into the reserve cavity inside the in-tank suction fuel filter. In this arrangement it is suggested to design the filter with the preferred embodiment of three layers of porous filtration media to incorporate two reserve cavities of fluid. The lowermost cavity may contain unfiltered fluid entering from the valve and the uppermost reserve cavity contains fluid filtered through the upper and center layers of porous filtration media.

In another embodiment the in-tank suction fuel filter is comprised of two layers of porous filtration media separated by a cavity of fuel. The layers of porous filtration media may be comprised of the same pore size arrangement to act as the filtering function to remove dust and debris from the fuel as it enters the filter. The pore opening of the upper and lower layers is suggested to match the particle size filtering protection needed for the fuel pump, for example 40 micron. These fuel pump protection requirements range from 8 micron to 100 micron. This is the range of particle that can damage the internal components of the fuel pump. Different combinations of design and materials will make fuel pumps more susceptible to wear at a defined particle size area. Some fuel pumps are more durable to smaller particles and require less filtering out of the particles.

In another embodiment comprised of two layers of porous filtration media separated by a cavity of fuel, the two layers of porous filtration media may be comprised of different pore size arrangements. The lowest layer of media may be a tighter pore size and acts as a tight membrane that holds a reserve of fuel. The pore opening of this lowest layer of filtration media is suggested to be less than 20 micron to enable the capillary sealing action to maintain fluid internally to the filter. This media may be of the filtration media group that includes membranes, woven screen or non woven materials such as meltblown, wet laid and spunbond media. The uppermost layer of media acts as the filtering layer to remove dust and debris from the fuel as it enters the fuel pump. The pore opening of the upper layer is suggested to match the particle size filtering protection needed for the fuel pump, for example 40 micron. These fuel pump protection requirements range from 8 micron to 100 micron. This is the range of particle that can damage the internal components of the fuel pump. Different combinations of design and materials will make fuel pumps more susceptible to wear at a defined particle size area. Some fuel pumps are more durable to smaller particles and require less filtering out of particles.

The number of layers of porous filtration media can be further altered or increased to provide staged filtration or to incorporate different stages of filtered fluid in the reserve cavity.

In another aspect of the invention, the in-tank fluid filter can expand and contract in height to maintain contact of the filter to the floor of the fuel tank. This is accomplished through the flexibility of the media comprising the in-tank suction filter. This flexibility can be achieved with embodiments of the in-tank suction fuel filter having either two or three layers of porous filtration media separated by a reserve cavity of fluid.

To keep the bottom of the in-tank suction filter in contact with the floor of the fuel tank a bonded connection is made between the filter and the floor. The connection could be through a magnetic means with a magnet present on the filter and on the floor of the fuel tank. In another embodiment the connection between the filter and the floor of the fuel tank is made through a mechanical feature between a connector on the filter and a connector on the floor of the fuel tank. This may be through a snap between the connector or with a pin featured in the filter that is fed into a pin hole at the bottom the fuel tank. These are two examples of means of attachment but are not meant to limit the method of attachment used.

In another aspect of the invention, the in-tank fluid filter fits around the outside diameter of the fuel pump. This connection provides several benefits to the design of the fuel module. The interface between the in-tank suction filter and the pump creates a hermetically liquid tight seal to keep large particles from passing into the reservoir through the pump and filter interface. The interface provides a separation between the pump and the fuel tank to dampen vibrations from passing from the fuel pump to the vehicle chassis through the fuel tank. Additionally the interface provides a release path for electrostatic charges that can build inside the filter with the flow of hydrocarbon fluid. In addition, the presence of the fuel pump inside the filter provides the warm exterior of the fuel pump to act as a heating source inside the in-tank filter to reduce freezing of the fluid inside the filter.

BRIEF DESCRIPTION OF THE DRAWINGS

The drawings may not be true to scale and serve to emphasize certain details of the various aspects of the invention.

DETAILED DESCRIPTION OF THE DRAWINGS

Figure 1:
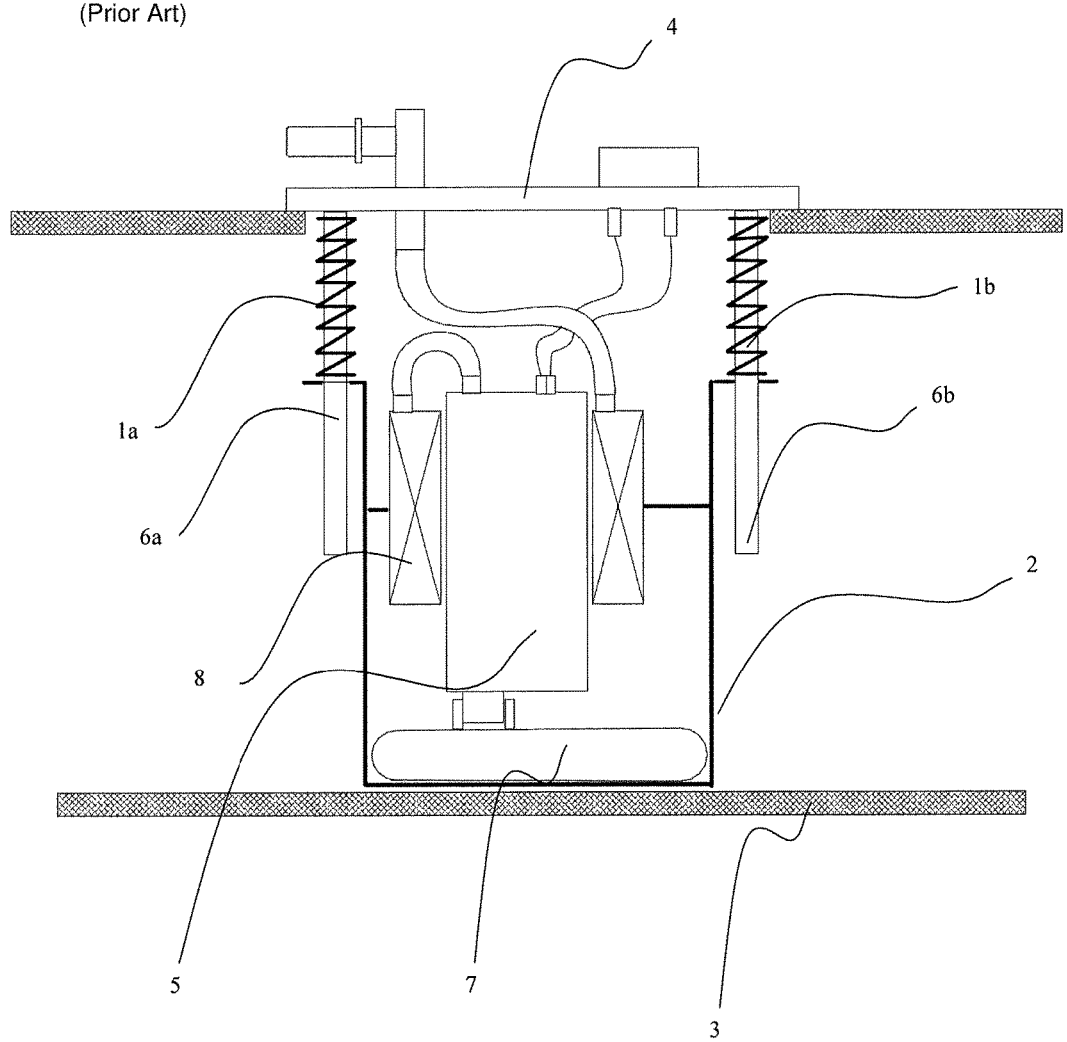
FIG. 1 is an illustration of a fuel delivery module with reservoir can and height adjusting springs according to the present prior art invention.

FIG. 1 shows a schematic view of the present art. In this present art the fuel present inside the fuel tank (3) is sucked into the hard body reservoir (2) through the in-tank suction filter (7) by the fuel pump (5). Fluid exits the fuel pump (5) and enters an optional housed filter element (8). Fluid exits the housed filter element (8) and flows through a port in the flange (4) and goes to the automotive engine.

A Fuel Delivery Module fits inside the fuel tank (3). The fuel pump (5) is connected at the bottom to an in-tank suction filter (7) and both are placed inside a hard body reservoir (2). To ensure there is contact of the bottom of the reservoir (2) to the floor of the fuel tank (3) there are springs (1a and 1b) attached to the top of the fuel tank to push the hard body reservoir (2) along the rods (6a and 6b). The springs (1a and 1b) are supported with the rods (6a and 6b). Tension of the springs keeps the hard body reservoir (2) pushed against the bottom of the fuel tank (3). The hard body reservoir (2) is designed to stay at the bottom of the fuel tank (3) to allow the fuel pump (5) and in-tank suction filter (7) to remain in contact with fuel when the level of fuel in the fuel tank (3) is low. At the top of the fuel tank (3) the springs (1a and 1b) are supported with the rods (6a and 6b) by the flange (4). The flange (4) is used to hermetically close the hole at the top of the fuel tank (3).

A housed filter element (8) is often designed inside the hard body reservoir (2) as shown or may be located above the hard body reservoir (2) (not shown) or outside the fuel tank (not shown). This housed filter element (8) filters the fluid exiting the fuel pump (5). In FIG. 1 the housed filter element (8) is used to position and hold the fuel pump (5) inside the hard body reservoir (2).

In the prior art the hard body reservoir (2) is a plastic or metal canister that requires a minimum volume of fluid inside it to supply the fuel pump with a constant flow of fuel under conditions when the fuel level around the reservoir is low. This reservoir is designed to hold fluid around the in-tank suction filter (7) in the event of fuel sloshing or moving away from this area of the fuel tank(3) during a hard vehicle turn or on an incline when the fluid will move, flow and gravitate away from this area in the tank. We have discovered that the hard body reservoir (2) exhibits difficulty when installing the unit in to the fuel tank (3), requiring a large opening in the tank and a spring loaded device to maintain contact with the tank floor (3). These functions are a large portion of the cost associated with the unit.

Figure 2:
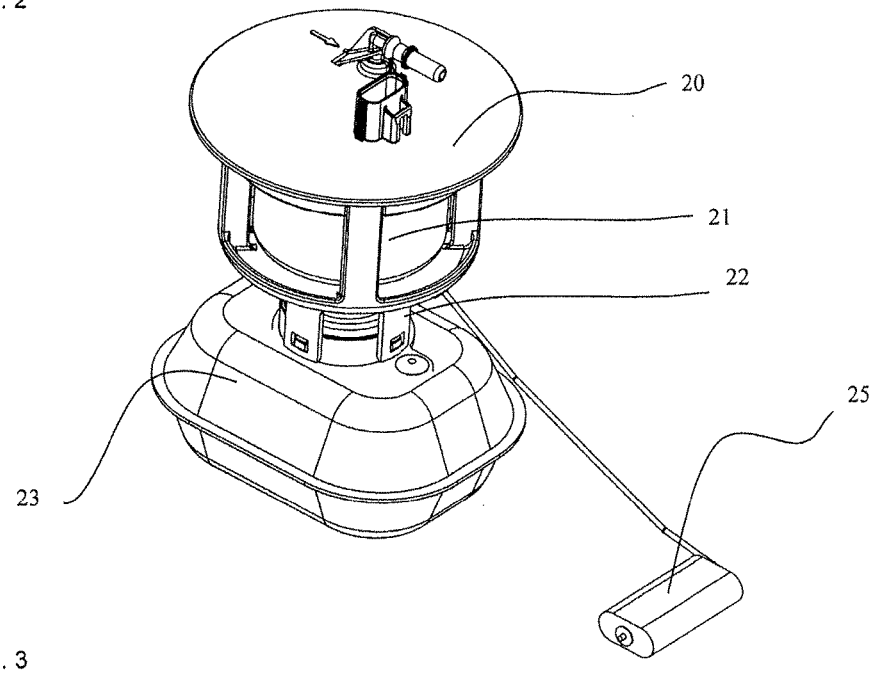
FIG. 2 is a schematic perspective view showing a fuel delivery apparatus according to the preferred embodiment of the present disclosure.

FIG. 2 illustrates the present invention of a fuel delivery module. The present invention includes an in-tank suction filter (23) that filters the fuel and provides the fuel pump (5) with a constant supply of filtered fuel. The in-tank suction filter (23) performs the functions of the hard body reservoir (2), the rods (6a and 6b) and the springs (1a and 1b) of the prior art as shown in FIG. 1. This greatly reduces the complexity and cost of the fuel delivery module. In addition, the in-tank suction filter is presented inside the fuel tank (3) instead of inside the hard body reservoir (2), allowing the filter to experience a washing effect of fuel to clean the surface of filter media during fluid sloshing and incline events. This washing effect can prolong the life of the filter by removing debris that may clog the surface of the filter and reduce fuel flow through the filter.

In this configuration the filter can also provide over 4 times the surface area of filtration than in the present art configuration because elimination of the hard body reservoir allows for more space for larger filter sizes. More surface area provides more filtration media and increases the amount of debris that the in-tank suction filter can clean from the fuel before it becomes plugged. A filter support (22) is connected to the top of the in-tank suction filter or molded to it and surrounds the fuel pump to provide the structure between the in-tank suction filter (23) and the flange (20) of the fuel pump. In some embodiments a housed filter element (21) (i.e. pressure filter) is present between the filter support (22) and the flange (20). A fuel level sensor float (25) can be connected to the filter support (22) to communicate to the driver the fuel level present in the fuel tank. Ideally the fuel level sensor float (25) would be attached to the in-tank suction filter (23) to provide a reference point to the bottom of the fuel tank.

Figure 3:
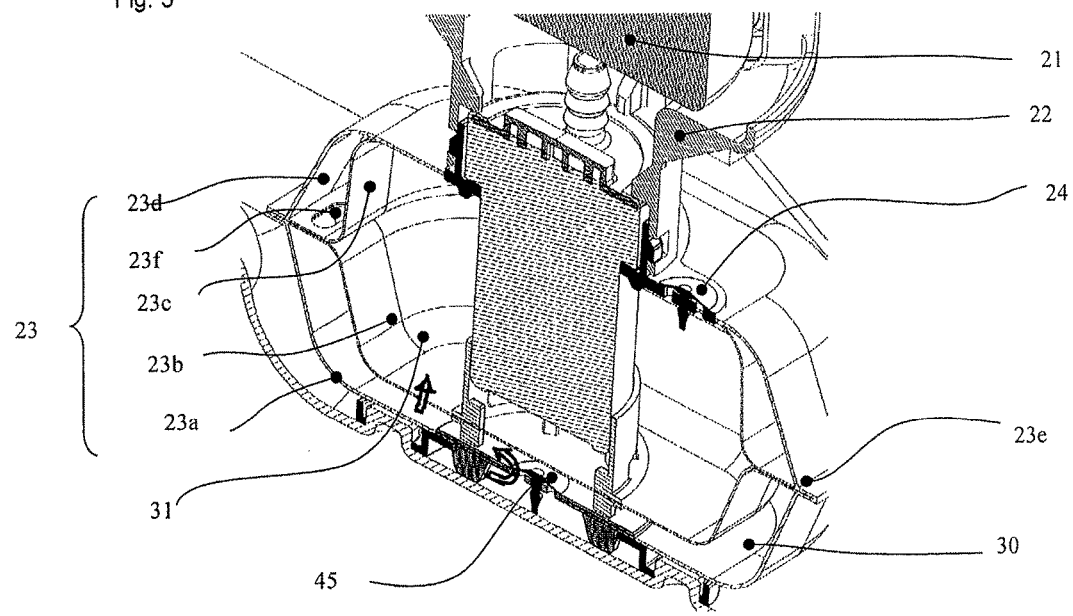
FIG. 3 is a schematic partial cross-sectional view, taken along the center of FIG. 2, showing an in-tank fluid filter as a reservoir of fluid with the fuel pump located internal to the in-tank fluid filter according to the first embodiment of the present disclosure.

FIG. 3 shows a cross sectional view to further detail the functions of the components. Fluid enters the filter through the umbrella valve (45) or through the filtration layers (23a-23d). The function of the umbrella valve (45) is to allow liquid to flow into the cavity and keep the liquid into the cavity when the pump is not running. Other one-way valves, such as flap valves, venturi tubes or pressure-sensitive valves may also be employed. The filter layers (23a-23d) are design to retain the liquid inside the filter cavity and filter out debris from the fluid. The fuel in the filter cavity provides a constant supply of fuel to the pump, especially needed when the supply of fuel around the module is reduced such as in times when the fuel in the tank is low or when the fuel moves to other areas of the fuel tank such as in a condition when the vehicle momentum pulls fuel to other locations or when the vehicle is at an angle such as on a hill.

The cross-sectional view of FIG. 3 shows the layers of the filter media structure (23a-23b-23c-23d). The outside layers (23d and 23a) are made with closed mesh opening like a tight membrane or a small pore size, preferably of woven or non woven synthetic material. Preferably the pore size is 20 micron or less, which does allow some limited amount of fluid to flow through the material, but generally acts to restrict fluid flow there through. In another embodiment these outside layers are made from a nonporous film, for example made from a plastic nylon, polyester or acetal. In this embodiment the vast majority of fluid flow into the reservoir (e.g. 80% or greater) would be through the umbrella valve (45).

The inner layers (23b+23c) are made with porous media in a woven or nonwoven filtration material. The inner layers (23b and 23c) act as the filtering layer to remove dust and debris from the fuel as it enters the fuel pump. The pore opening of the inner layer is suggested to match the particle size filtering protection needed for the fuel pump, for example 40 micron. These fuel pump protection requirements range from 8 micron to 100 micron. This is the range of particle that can damage the internal components of the fuel pump. Different combinations of design and materials will make fuel pumps more susceptible to wear at a defined particle size area. Some fuel pumps are more durable to smaller particles and require less filtering out of particles.

Additional layers of filtration media may be added to stage the filtration of the layers and extend the life of the filter before the pores are clogged with debris.

The different layers (23a+23b+23c+23d) are joined together, preferably around their periphery as shown. The joining method may be by adhesive, chemical means or preferably by welding using ultrasonic, vibration or radio or high frequency. Welding creates a sealing layer (23e) in a single or multiple step process.

A clearance or a gap between the outside layer (23d+23a) and the inner filtration layer (23b+23c) is established to allow the liquid circulation between the two layers to optimize the filtration surface and maximize filter life. This gap defines a first reserve cavity (30) of generally unfiltered fuel. The interior space created by and between the inner filtrations layers 23b and 23c creates a second reserve cavity (31) of filtered fuel.

Holes (23f) are distributed inside the filter between the outside membrane layer (23d+23a) and the inner filtration layer (23b+23c) are to allow the liquid to pass between both sides of the welding line (23e), i.e. to connect the upper and lower portions of the first reserve cavity (30).

Figure 4:
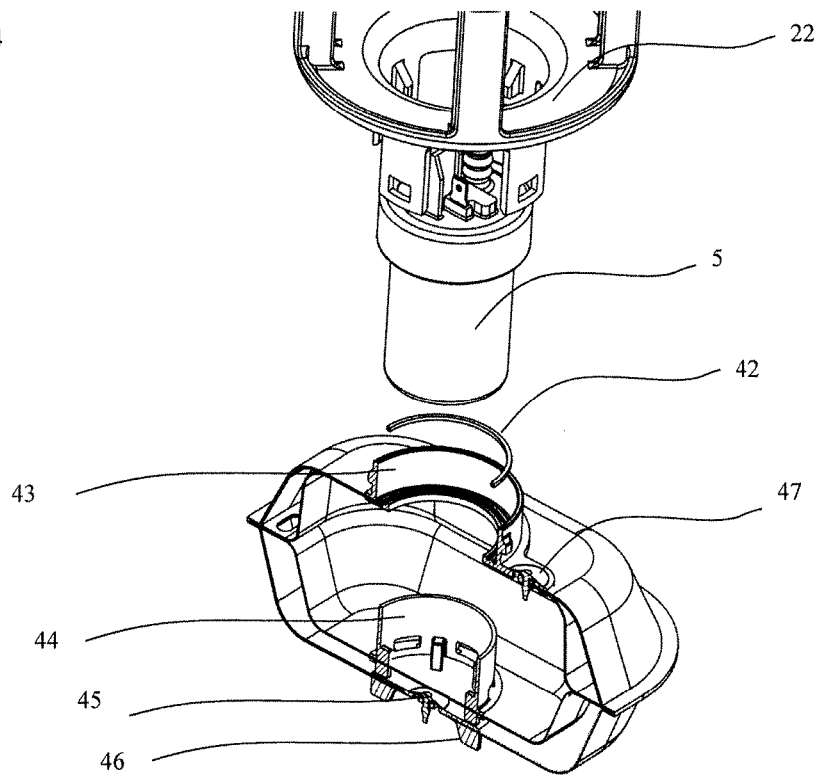
FIG. 4 is an exploded cross sectional view of the in-tank suction fluid filter and fuel pump of FIG. 3 according to the first embodiment of the present disclosure.

FIG. 4 is an exploded view detail showing the assembly of the invention. For the assembly, a gasket (42) is placed into the filter connector (43) and the pump (5) is introduced inside the filter. The gasket (42) and connector (43) are structures to interconnect with the filter support (22) noted above. The pump (5) is supported from the top side into the filter connector (43) by the gasket (42). The pump is guided into the bottom of the filter by a pump guide (44), which is sized to receive a lower end of the pump (5) therein. The lower end of the pump (5) draws fluid from the reserve cavities (30, 31). The umbrella valve (45) is located below the pump (5) for filling of fluid into the first reserve cavity (30). The suction of the pump opens the umbrella valve (45) and allows unfiltered fluid to enter the first reserve cavity (30) of the filter. A venting umbrella valve (47) is preferably placed on the top of the filter to release air that is captured inside the filter when the fuel/liquid comes inside the filter from the lower umbrella valve (45), and is also opened by pressure from the pump (5).

The filter bottom (46) has filter supports (46b) to raise the filter off the surface of the tank. These filter supports are preferably molded as part of the filter, but may also be attached by other means. The size of the filter supports should be sufficient to raise the filter off the bottom of the fuel tank to allow for flow of fluid to the bottom of the filter and the umbrella valve (45).

Figure 5:
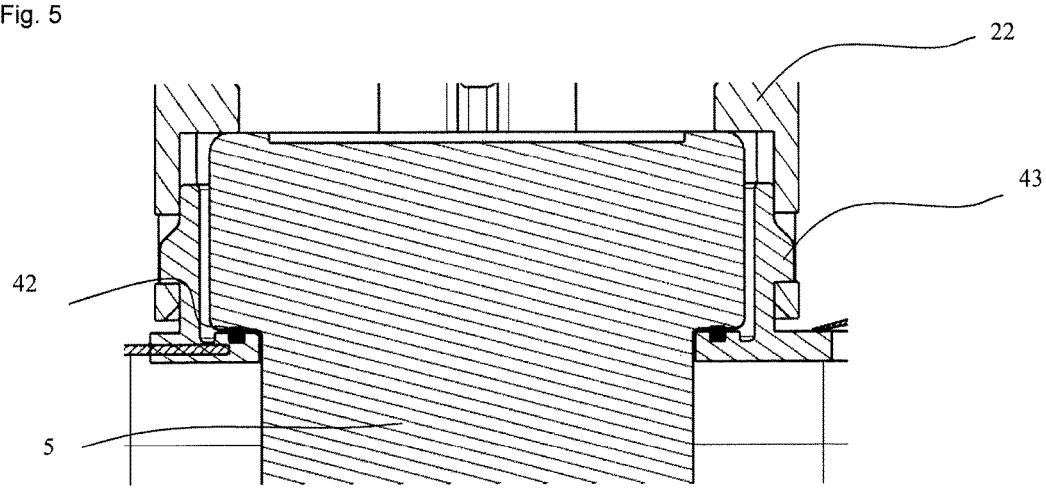
FIG. 5 is an enlarged cross sectional view of FIG. 3 showing the method of connection between the top of the in-tank suction fluid filter and the top of the fuel pump.

FIG. 5 is a cross-sectional view of the sealing of the fuel pump (5) to the pump connector (43) with the gasket (42). A liquid tight seal is provided between the fuel pump (5) and the pump connector (43). The connection also provides vibration damping between the pump (41) and the vehicle. The connection is made through compression of the gasket (42) by the weight of the fuel pump (5), as well as the relative sizing and interaction between filter support (22) and connector (43). The connection is maintained with compression of the gasket by clipping or welding the filter support (22) to the pump support (43). The filter connector (43) is directly attached to an upper portion of the filter (23), such as by being over molded or welded on the upper layer 23d, or otherwise integrated as part of the filter.

Figure 6:
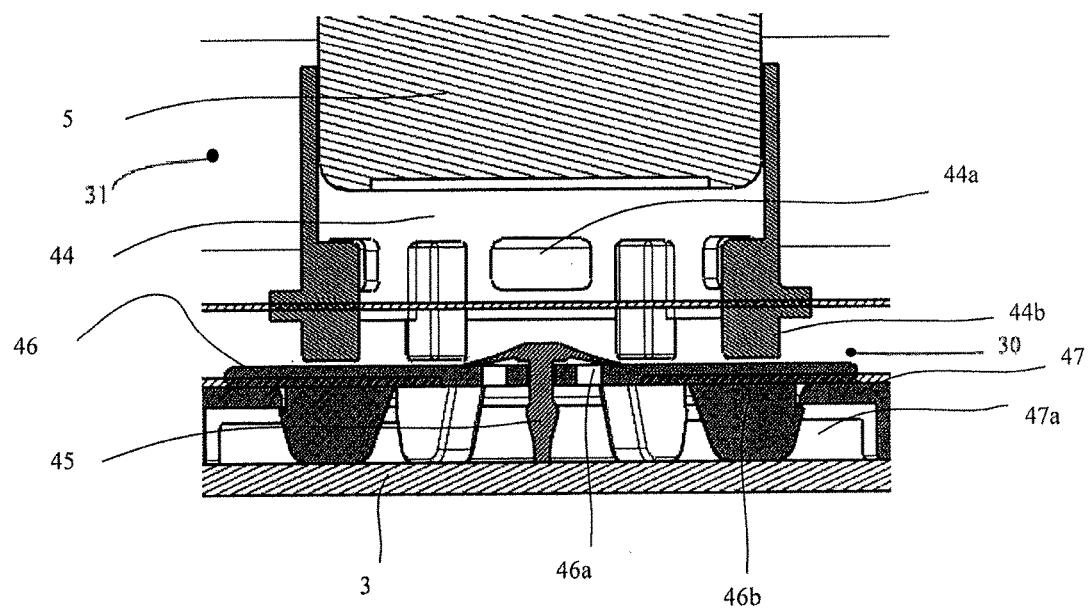
FIG. 6 is an enlarged cross sectional view of FIG. 3 showing the method of connection between the center of the in-tank suction fluid filter and the bottom of the fuel pump.

FIG. 6 is a cross-sectional view that provides detail on the lower interface between the pump (5) and the filter (23) and the bottom of the fuel tank (3). The bottom of the filter (23) will be attached to the fuel tank (3) by means of clip between the filter bottom (46) (e.g. formed by layer 23a) and a filter retainer (47) attached to the floor of the fuel tank (3). This ensures that the bottom of the module is as close as possible to the bottom of the tank to access fuel during low fuel conditions. As can be seen, this structure fixes the filter bottom (46) of the filter to the fuel tank (3) for movement therewith as the tank expands or contracts. The filter retainer (47) is preferably over molded on the bottom tank wall (3) or otherwise rigidly connected thereto (e.g. using bonding materials such as adhesives/fasteners or bonding techniques such as friction welding) to have an unmovable connection. Filter supports (46b) are distributed on the lower face of the filter bottom (46) to provide a clearance to allow fuel/liquid to go into the filter (23) through the holes (46a) which are protected by the umbrella valve (45). The filter supports (46b) are fitted out of undercuts to ensure the connection with the filter retainer (47). The filter bottom (46) is over molded or welded to the filter.

The fit between the pump (5) and the pump guide (44) is tight and hermetic. Expansion and contraction of the tank will cause motion of the pump up and down and this motion will transfer to an up and down movement of the pump guide (44). The bottom of the pump guide (44) is free to allow for this motion. The pump guide (44) includes pump guide legs (44b) distributed all around the bottom of the pump guide (44) and projecting downwardly to ensure a clearance between the membrane layer (23a) and the filtration layer (23b), and hence creation of the first reserve cavity (30). These pump guide legs (44b) create separation between the first reserve cavity (30) and the second reserve cavity (31) The pump guide (44) is provided with open windows (44a) to maintain fluid flow to supply liquid to the pump (5) from the second reserve cavity (31). The pump guide (44) is preferably over molded on the filter (23), and namely the second layer 23b. The filter retainer (47) has at its periphery windows (47a) to supply fuel/liquid into the filter bottom (46)

Figure 7:
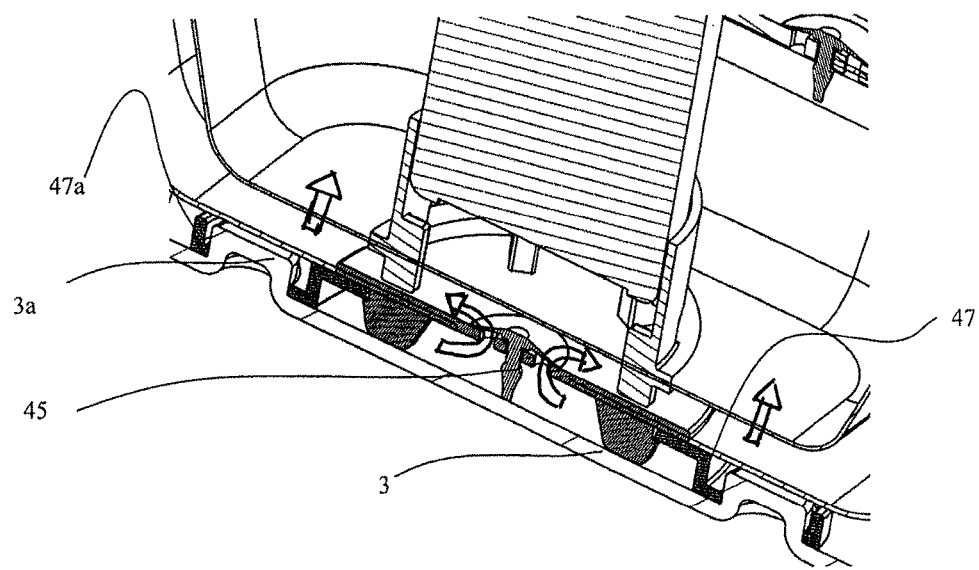
FIG. 7 is an enlarged cross sectional view of FIG. 3 showing the method of connection between the bottom of the in-tank fluid filter and the bottom of the fuel tank according to the first embodiment of the present disclosure.

FIG. 7 further illustrates the details of the interface between the filter retainer (47) and the bottom tank wall (3). The preferred solution is to place the filter retainer (47) on one of the two extruded tank sheets before the blowing operation to manufacture the fuel tank. Plastic tanks are generally manufactured by blowing two polymeric sheets into a form. During the blowing operation several shapes (3a) are generated through the filter retainer holes (47b) to fix the filter retainer (47). The number and the position of the shape (3a) depends the tank configuration A second possible solution is to place the filter retainer (47) into the finish tank (3) and deform by bringing heat the bottom tank wall to create the shape (3a) through the filter retainer holes (47b)

Figure 8:
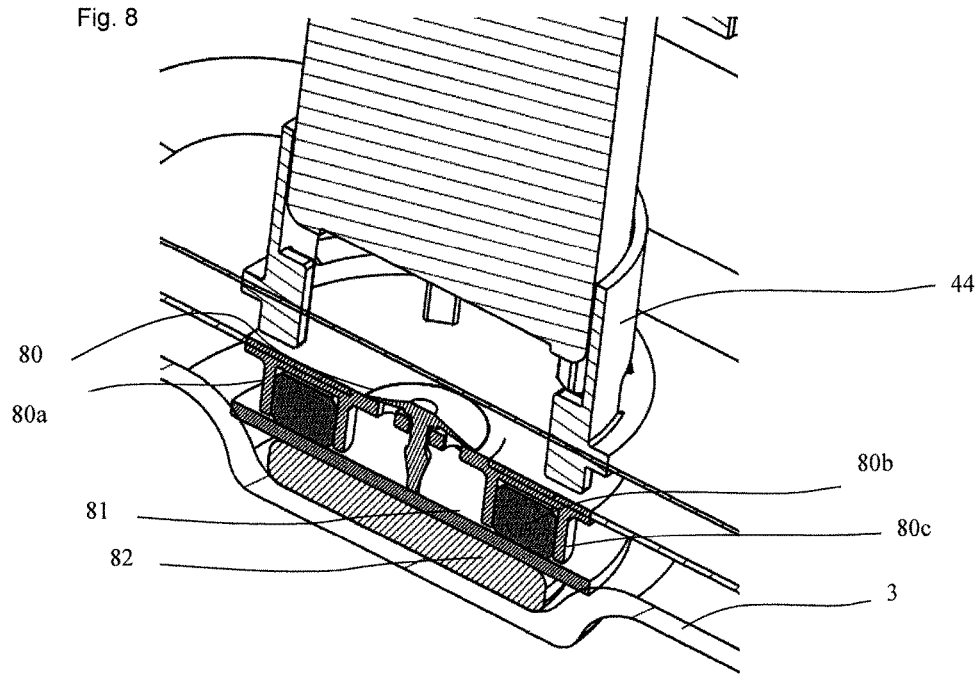
FIG. 8 is an enlarged cross sectional view showing an alternate method, to FIG. 7, of the connection between the bottom of the in-tank fluid filter and the bottom of the fuel tank.

FIG. 8 shows the cross-sectional view for an alternative embodiment for connecting the filter bottom (80) to the bottom of tank (3). Here the connection is made with a magnet (82) enclosed into the tank shell (3) by a cover (81). From the filter bottom side several magnetic parts (80b) are distributed around the filter bottom part (80). The magnetic parts (80b) are fitted into dedicated magnetic housings (80c). there are several magnetic housings (80c) distributed around the bottom of the surface filter bottom (80) to ensure fuel/liquid supplying through the rubber umbrella valve (45)

An additional advantage to using the magnetic connection is to provide a method for magnetic particles to be captured by the magnet. This would include particles smaller than the pore size opening of the filtration layers. These small magnetic particles would be captured by the magnet and not pass through the filter to the pump to cause pump wearing and decreased life. Capturing of magnetic particles by the magnetic connection also reduces the amount of debris captured in the filtration layers and increases the lifetime of the filter.

Figure 9:
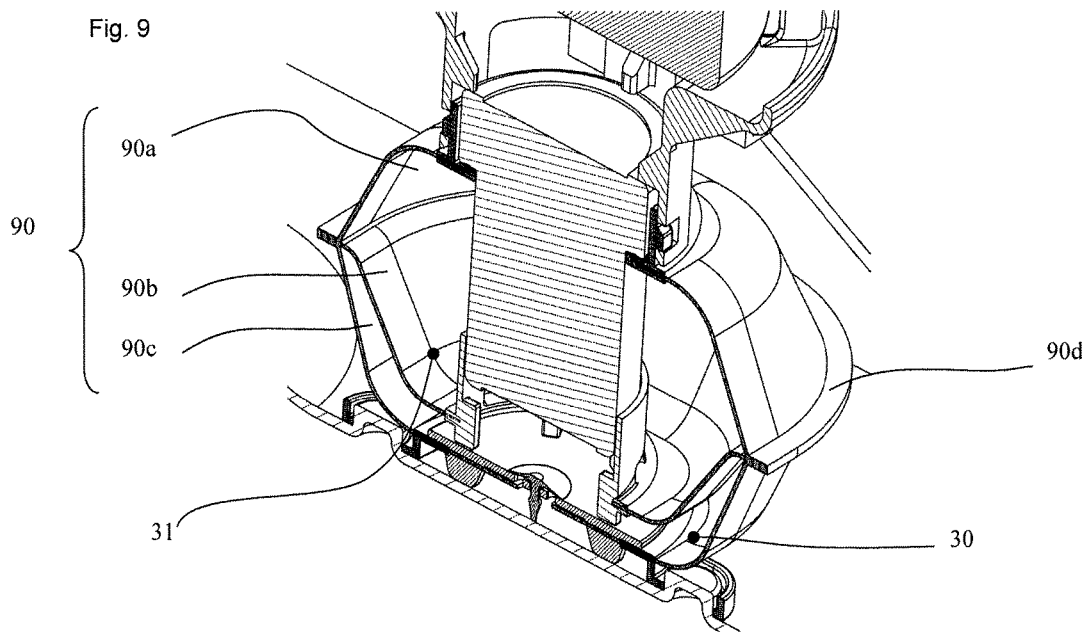
FIG. 9 is a schematic partial cross-sectional view of FIG. 3, showing an in-tank fluid filter as a reservoir of fluid with the fuel pump located internal to the in-tank fluid filter according to the second embodiment of the present disclosure.

FIG. 9 details a cross-sectional view of an alternative embodiment to the first embodiment shown in FIG. 3. In this configuration the upper membrane layer (23d, see, e.g. FIG. 3) has been removed. This reduces the volume of unfiltered fluid by reducing the size of first reserve cavity (30) and exposes the upper filter layer (90a) directly to the unfiltered fuel in the fuel tank. The filter (90) is composed in the lower side by a membrane (90c), and internally by a lower filtration material layer (90b) while the upper side is only formed by upper filtration layer (90a). Thus, fuel may enter the second reserve cavity directly through the upper layer 90a. In this alternative configuration, by having no upper membrane layer (e.g. 23d in FIG. 3) from the top filter (90) side, there is no need to have venting valve (47 FIG. 4) to remove air inside the filter (23), as air can likewise escape through upper layer 90a.

Figure 10:
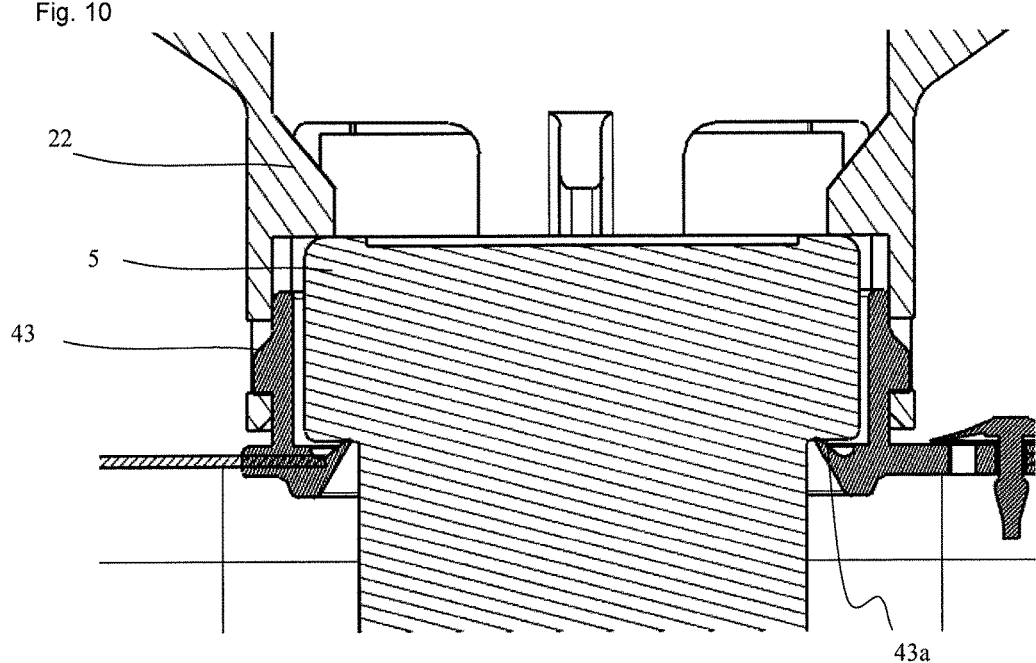
FIG. 10 is an enlarged cross sectional view showing an alternate method, to FIG. 5, of the connection between the top of the in-tank fluid filter and the top of fuel pump

FIG. 10 includes another alternative embodiment to connect the pump (5) to the filter connector (43). In this solution the gasket (42) in FIG. 5 is eliminated and sealing is achieved with a flexible plastic lip (43a). The plastic lip (43a) is compressed by the pump (41) to ensure liquid tightness between the filter support (22) and the filter connector (43). The lip is flexible to compensate for variations in component heights.

Figure 11:
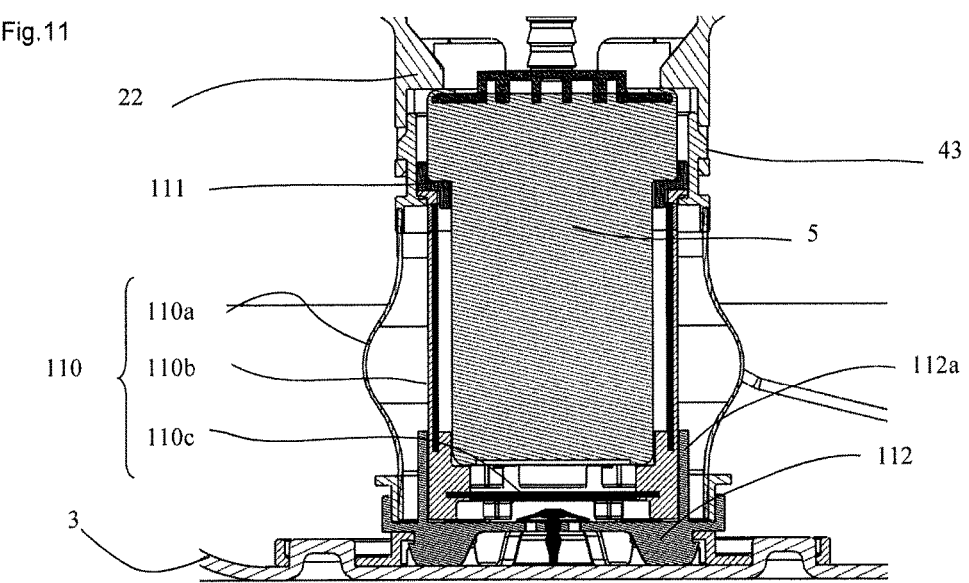
FIG. 11 is schematic cross-sectional view, showing an alternate filter design, to FIG. 3, with the filter in a cylindrical form.

FIG. 11 is a cross section view of an alternative design to the filter layers of FIG. 3. This alternative design includes a cylindrical filter (110) composed of one outside cylindrical layer (110a). The cylindrical layer (110a) is made with excess material in a concave manner to be flexible to move inward and compensate for expansion and contraction of the fuel tank. On the bottom on the filter (110) a disc of media (110c) is over molded to provide filtering of the fluid entering from the umbrella valve. The various structures of the lower filter structures shown in FIGS. 6-7 or FIG. 8 or FIG. 9 may be used to form the lower portion of the cylindrical filter 110 and attach it to the fuel tank (3). As in these figures, the pump guide (44) is provided with open windows (44a) to maintain fluid flow to supply liquid to the pump (5). The filter retainer (47) has at its periphery windows (47a) to supply fuel/liquid into the filter bottom (46).

The fuel delivery module described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A fuel delivery module for a fuel tank, the module having a pump and filter structure comprising:
    a fuel pump having an inlet and an outlet, the pump inlet port having a flow axis defined by an intended direction of fluid flow from the filter to the fuel pump; and
    an in-tank fluid filter surrounding at least a portion of the fuel pump for filtering fuel entering the inlet of the fuel pump, the filter comprising,
        a filter connector to attach the filter to the fluid pump,
        a filter body including an outer layer and an inner layer defining a reserve cavity therebetween and within the filter body, wherein the inner layer is formed of a material having a pore size greater than the outer layer, and wherein at least a bottom portion of the outer layer made from a non-porous film to restrict the flow of fuel therethrough such that the reserve cavity within the filter body is configured to hold a supply of fluid for the fuel pump, and
        one of a valve or venturi tube being present and connected to the outer layer and configured to allow fluid to flow into the reserve cavity of the filter.

2. The module of claim 1, wherein the reserve cavity contains at least 450 milliliters (mL) of fluid by volume.

3. The module of claim 1, wherein the filter body is comprised of two or more individual layers of porous material separated by the reserve cavity.

4. The module of claim 1, wherein the filter body can expand and contract vertically while maintaining contact with the floor of the fuel tank.

5. The module of claim 1, wherein the bottom portion of the filter is attached to the floor of the fuel tank.

6. The module of claim 5, wherein the bottom portion the filter is attached mechanically to the floor of the fuel tank by means of a plastic connector present on the filter surface and a plastic connector present on the floor of the fuel tank.

7. The module of claim 1, wherein a valve is present to release air out of the reserve cavity.

8. The module of claim 1, wherein the pump is fitted inside the filter to provide thermal exchange from the pump body to the fluid inside the reserve cavity.

9. The module of claim 1, wherein the filter connector fits around the top of the fuel pump body.

10. The module of claim 9, wherein the interface between the pump and the filter is an elastomer gasket that is compressed to provide a hermetic liquid seal and vibration dampening device.

11. The module of claim 9, further comprising a filter support attached to the filter connector, wherein the filter connector is attached to an upper end of the filter body to maintain the reserve cavity within the filter body.

12. The module of claim 1, wherein the bottom portion of the outer layer is formed of a nonporous film.

13. The module of claim 1, wherein at least 80% of the fuel in the reserve cavity flows through the valve or venturi tube.

14. The module of claim 1, wherein the filter body includes two outer layers and two inner layers between the two outer layers, and wherein the reserve cavity is located between the two outer layers and the two inner layers.

15. The module of claim 1, further comprising a fuel level sensor float that detects and communicates the fuel level present in the fuel tank.

* * * * *